(12) United States Patent
Custer

(10) Patent No.: US 9,704,190 B2
(45) Date of Patent: *Jul. 11, 2017

(54) EMAIL CHECKOUT SYSTEM FOR COMPLETING WEBSITE CART CHECKOUT

(71) Applicant: @PAY IP HOLDINGS LLC., Wilmington, DE (US)

(72) Inventor: Matthew Custer, Albuquerque, NM (US)

(73) Assignee: @PAY IP HOLDINGS LLC, Wilmington, DE (US)

( * ) Notice: Subject to any disclaimer, the term of this patent is extended or adjusted under 35 U.S.C. 154(b) by 521 days.

This patent is subject to a terminal disclaimer.

(21) Appl. No.: 14/170,030

(22) Filed: Jan. 31, 2014

(65) Prior Publication Data
US 2014/0222624 A1 Aug. 7, 2014

Related U.S. Application Data

(60) Provisional application No. 61/759,614, filed on Feb. 1, 2013.

(51) Int. Cl.
*G06Q 30/06* (2012.01)
(52) U.S. Cl.
CPC .................. *G06Q 30/0637* (2013.01)
(58) Field of Classification Search
CPC ...... G06Q 30/0637; G06F 21/31; G06F 21/41
See application file for complete search history.

(56) References Cited

U.S. PATENT DOCUMENTS

| 5,903,878 A * | 5/1999 | Talati ..................... G06Q 20/02 705/26.41 |
| 2004/0098313 A1 * | 5/2004 | Agrawal ................ G06Q 20/00 705/51 |
| 2007/0157291 A1 * | 7/2007 | Chua .................. H04L 63/0807 726/4 |
| 2012/0310753 A1 * | 12/2012 | Gaddis ............... G06Q 30/0241 705/14.73 |

* cited by examiner

*Primary Examiner* — Noura Zoubair
(74) *Attorney, Agent, or Firm* — Volpe and Koenig, P.C.

(57) ABSTRACT

A system for leveraging email to complete an online checkout from a customer accessing a third party vendor website is disclosed. The system may store customer information including a name, email address, shipping address, and billing information. The system may receive a request for a purchase from the third party vendor including a customer email address and an item to be purchased. The system may authenticate the customer email address. The system may send a first email to the customer email address requesting authorization to complete a purchase. The system may receive a second email, from the customer email address, encoded with the token and confirming or canceling the purchase. The system may authenticate the second email using the customer email address and the token. And the system may transmit a confirmation of purchase of the at least one item to the third party vendor website.

15 Claims, 18 Drawing Sheets

EMAIL CHECKOUT SYSTEM FOR COMPLETING WEBSITE CART CHECKOUT

CROSS REFERENCE TO RELATED APPLICATION

This application claims the benefit of U.S. provisional application No. 61/759,614 filed on Feb. 1, 2013, which is incorporated by reference as if fully set forth.

FIELD OF INVENTION

This invention is related to electronic payment systems. More particularly, the invention is related to payment systems for completing a financial transaction utilizing email payment for website checkout.

BACKGROUND

Online businesses allow users to browse a website for items that are of interest, provisionally select items that they would like to buy, and then pay for those items online. Typically, it is beneficial for the online business to make it as easy as possible for customers to purchase multiple products in one transaction. To facilitate the process of completing online transactions. To this end many websites use a place where selected items for purchase are stored, such as a virtual or online shopping cart.

As customers explore a website, the shopping cart allows customers to add items of interest with a single click. The items are added to the shopping cart, without having to direct the user away from the web page that they were browsing. This allows a shopper to continue adding items without disrupting their search. Typically, a website will include a link to the shopping cart on each page. This provides the customer with quick access to shopping cart. From the cart, the customer can determine the list of items that are currently stored in the cart, the price of each item, and a running total for all items. This may allow a customer to adjust purchases as they continue to shop on the website.

Currently, there are many available shopping cart applications, some even provided when a website vendor purchases a website template. An online business can choose a simple option that's easy to install and manage, or may have a customized cart that tailors every step of the experience for customers. It all depends on a website vendor's budget and needs.

While shopping carts offer quick experiences for conveniently holding items ready for purchase, customers proceeding to checkout currently have limited payment options. The customer must either: 1) enter account information for a payment method such as a credit card or bank account, or 2) enter account information for a payment method that interacts with a third party that has already collected the account information on that customer's behalf, (such as PAYPAL). Sharing payment information may open the possibility for fraud by exposing that information to potentially non-trustworthy parties. Using a third party to manage the sharing of that information reduces this possibility, but forces the customer to authenticate with the credentials from this system. This increases the frustration and concern for consumers, particularly in view of the reoccurring reports of identity theft and personal data breaches.

The entry of the authentication details on systems such as PAYPAL requires potentially sensitive information to be provided within a browser session. Two-factor authentication systems such as TOTP (the time based one password algorithm) can be used in addition to the login information to provide additional security. Even if the information is stolen from the browser session, the credentials cannot be used without the theft of an item in customer's possession. Though two-factor authentication is becoming popular, it still requires the user to submit their credentials and then use a secondary application that they may not have installed to generate a code, or to verify a text message. This is a process that burdens the customer and can potentially lead to a period where a checkout will not be completed due to complications of authentication. Accordingly, improved methods for completing website cart checkouts are desired.

SUMMARY

A system for leveraging email to complete an online checkout from a customer accessing a third party vendor website is disclosed. The system may store customer information including a name, email address, shipping address, and billing information. The system may receive a request for a purchase from the third party vendor including a customer email address and an item to be purchased. The system may authenticate the customer email address. The system may send a first email to the customer email address that requests authorization to complete a purchase. The system may receive a second email, from the customer email address, encoded with the token and confirming or canceling the purchase. The system may authenticate the second email using the customer email address and the token. And the system may transmit a confirmation of the purchase to the third party vendor website.

The system described herein allows a vendor to use a token created during web registration to provide a payment option from the vendor's website. By using the token, the vendor may avoid collecting a customer's payment information each time a customer wishes to make a new purchase.

With the email based payment system, a customer has the option of completing a transaction and making a payment using one or more emails. The customer receives an email message that contains a mailto: hyperlink and predefined body. The body of the email message may include a button graphic embedded with code that the customer may click when selecting their payment amount or item to purchase. By selecting the button, a reply email message may be generated confirming or cancelling the purchase. The reply email message may include a token.

A payment server may receive the reply email message, including the token that has been submitted by the user's email client. The payment server may parse the sender of the message, attempt to find the sender in its database, and, assuming success, it parses the token in a novel decoding process. The first stage in the decoding process may determine the merchant for which this token is valid. In a second stage, after discovery of the merchant, a public key for the merchant is used to decrypt an encrypted portion of the token and then validate the authenticity of the token and provide further instructions for how to process the payment.

In one embodiment, the methods allow for this feature to "plug in" on any website checkout page such that the user is able to complete the transaction by email. This is a much more desirable method of completing the transaction for mobile users.

BRIEF DESCRIPTION OF THE DRAWINGS

A more detailed understanding may be had from the following description, given by way of example in conjunction with the accompanying drawings wherein.

DETAILED DESCRIPTION

When used herein, the term "token" may refer a string or file used to authenticate a transaction. A token may be one or multiple encrypted strings, files, passwords, cyphers or other data which may contain information used to perform or authenticate a transaction when sent to payment servers. These tokens may be encrypted using a public-private key encryption system. The vendor or a party with knowledge of the vendor's private key may generate an encrypted token. Alternatively, a payment system or e-commerce site may generate this token on behalf of the vendor.

Disclosed herein are processor-executable methods, computing systems, and related technologies for an email checkout system for completing a website cart checkout. The system and method may use an email server/account to complete checkout of any type of product (e.g., items/services/events/donations) for a transfer of funds from a customer to a vendor (e.g. retail site, charity, political organization or other vendor.) The system allows the customer at checkout to bypass the e-commerce site's credit card and shipping address required fields by pushing the products in the e-commerce checkout cart through an e-commerce personal account. While the technologies described herein are discussed using email as an example, they may also be applicable to similar communication mediums, such as SMS and MMS communication channels.

Figure 1:
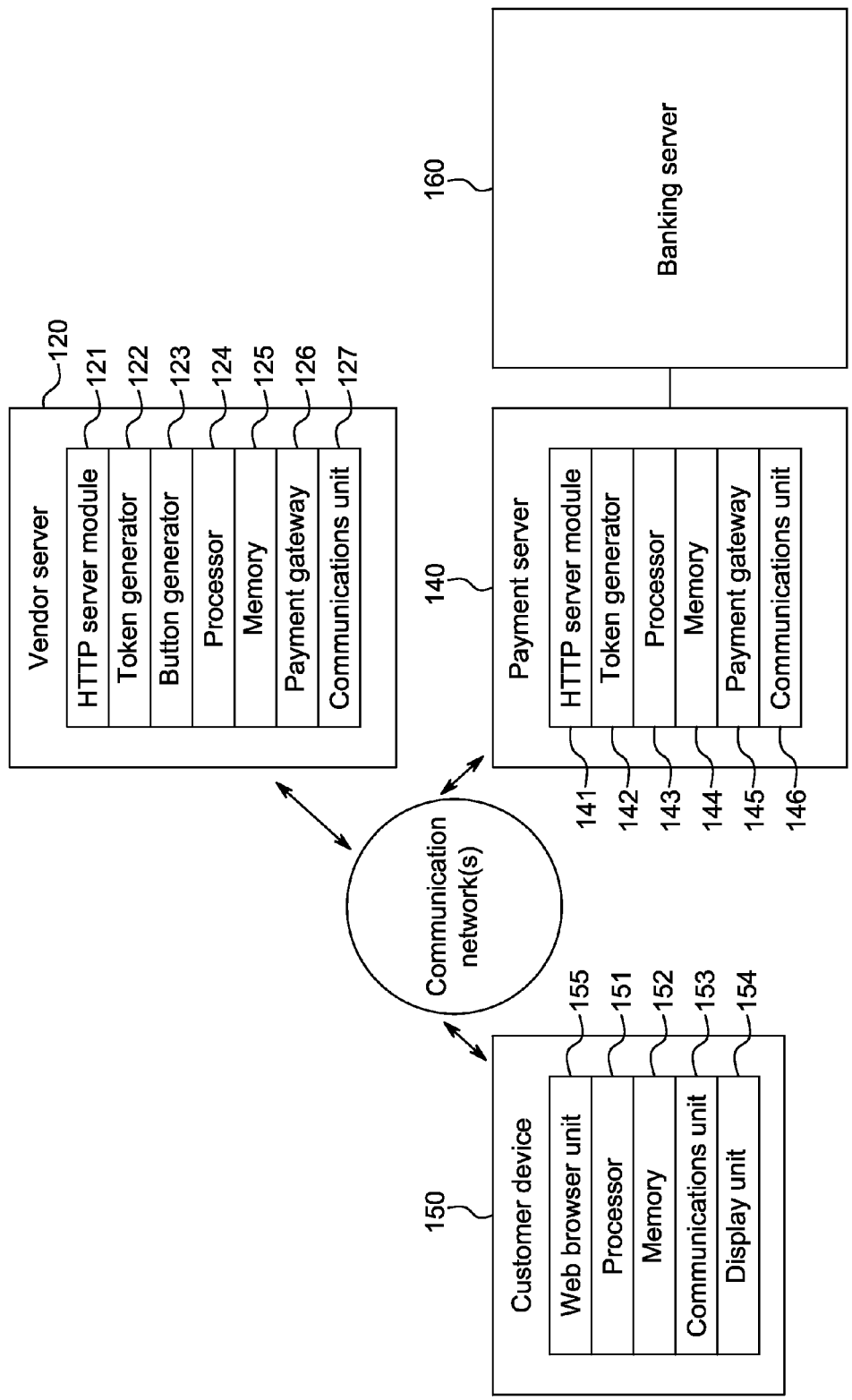
FIG. 1 shows an example system that may be used for email checkout from a website cart checkout.

FIG. 1 shows an example system 100 that may be utilized for email checkout from a website cart checkout. The example system 100 includes a customer device 150, a vendor server 120, a payment server 140, and a banking server that may communicate over one or more wired and/or wireless networks. The wired or wireless networks may be public, private or a combination of public or private networks.

The customer device 150 may be, for example, a cellular phone, a smartphone, a desktop computer, a laptop computer, a tablet computer, or any other appropriate computing device. The customer device 150 includes a processor 151, memory 152, a communications unit 153, a display unit 154 and web browser unit 155, which may communicate data to/from the web server module(s) in the vendor server 120 and payment server 140. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in or connected to the customer device 150, such as a liquid crystal display (LCD) display or monitor. The customer device 150 may receive input from the user of the customer device 150 from input devices (not depicted) that are included in, or connected to, the customer device 150, such as a keyboard, a mouse, a microphone or a touch screen, and provide data that indicates the input to the web browser unit 155.

The vendor server 120 may include an HTTP server module 121, a token generator 122, a button generator 123, a processor 124, memory 125, a payment gateway 126 and a communications unit 127.

The HTTP server module 121 provides a website that may be accessed by a customer device 150. The HTTP server module 121 may implement the HTTP protocol, and may communicate Hypertext Markup Language (HTML) pages and related data from the website to/from the customer device 150 using HTTP. The vendor server 120 may be connected to one or more private or public networks (such as the Internet), via which the HTTP server module 121 communicates with devices such as the customer device 150. The HTTP server module 121 may generate one or more web pages and may communicate the web pages to the customer device 150, and may receive responsive information from the customer device 150.

The HTTP server module 121 may be, for example, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The payment gateway 126 may be a proprietary service that service that directly connects with the payment processors, such as banking server 160 to handle the credit card data, and authorize credit card payments.

The token generator 122 may generate tokens for use in e-commerce transactions. Tokens may be encrypted strings which contain information to perform a transaction when sent to the payment server(s) 140. A token may be one or multiple encrypted strings, files, passwords, cyphers or other data which may contain information used to perform or authenticate a transaction. A token may include one or more of the following parameters or other parameters not listed below:

a) --private-key, -p<s>: [global] The private key provided by the payment server 140.

b) --public-key, -u<s>: [global] Payment server's 140 public key, provided by the payment server 140.

c) --partner-id, -a<i>: [global] The partner ID given provided by the payment server.

d) --environment, -e<s>: [global] The environment the vendor wants to generate buttons for. (default: production). This distinguishes whether the token is being used in a testing environment or in the live environment (and running real transactions).

e) --config, -c<s>: [global] The path to a configuration file in yml format. This may hold a default set of information, e.g., private_key, public_key, partner_id, and other information—so they don't have to be entered separately each time a token is generated. The config field may also contain information specific to an offer (like a dollar amount) or a customer (like the card token) if multiple tokens are being generated with similar components.

f) --type, -t<s>: [global] The type of token to generate (site, email, universal). There are multiple types of tokens that a token generator can generate and decode. For example, site tokens may be used for website transactions, email tokens for two-click email payments, and universal tokens for email validations.

g) --card, -r<s>: [site-token, email-token] The card token associated with the recipient of this token. When a customer is registered with the payment server 140, the vendor receives a credit card token—a unique identifier that references the specific card associated with that customer and vendor. When the vendor is generating a token to submit to payment server 140, they may include the card token as a customer identifier.

h) --email, -m<s>: [email-token] The email associated with the receipt of this token. Incompatible when 'type' is 'site' i) --URL, -l<s>: [universal-token] The Signup URL the recipient should go to if customer doesn't have payment information registered with payment server 140. Incompatible when 'type' is 'site' or 'email' j) --amount, -o<f>: [token] The amount a user should be charged for the transaction the token is generated for.

k) --user-data, -s<s>: [token] Data to pass back as a reference. This data may include custom data that the vendor may want to pass through the payment server 140 and receive back when a transaction has completed. It may include an item reference number or SKU, customer address, or other piece of data that is not required by payment server 140 to complete a transaction, but that the vendor wants associated with that transaction.

l) --expires, -x<i>: [token] Expiration date for token, integer value of seconds since epoch.

m) --header-user-agent, -h<s>: [site-token] The HTTP USER AGENT from the request header (if 'type' is 'site'). HTTP headers are sent as part of a request from a customer's web browser unit 155 for a piece of information. These headers define the parameters that the web browser unit 155 is expecting to get back. The user-agent is the identifier of the software that is submitting the request—typically the identifier of the web browser unit 155 that is requesting the content.

n) --header-accept-language, -d<s>: [site-token] The HTTP_ACCEPT_LANGUAGE from the request header (if 'type' is 'site'). The accept-language is the acceptable language for the response—e.g. the language in which the web browser unit 155 is requesting the content be sent back.

o) --header-accept-charset<s>: [site-token] The HTTP_ACCEPT_CHARSET from the request header (if 'type' is 'site'). The accept-charset is the character sets that are acceptable for the response—e.g. the character set in which the web browser unit 155 is requesting the content be sent back.

p) --ip-address, -i<s>: [site-token] The IP address of the token recipient (if 'type' is 'site').

To confirm a website checkout via email, the customer sends an email embedded with a token to the payment server's 140 address. The system 100 is designed to allow the vendor flexibility to offer deals for a limited time or number or responsive to available inventory. For example, the token may be configured to expire by default after two weeks, or any predetermined time, or never expire. The vendor server 120 may be configured to extend or shorten the expiration time of a particular offer associated with a token without resending an email or generating a new token. Also, the vendor server 120 may send email updates for an offer associated with a token. This may be predetermined, or may be later set, depending upon demand by customers. Additionally, the vendor server 120 may generate groups of token values that may automatically invalidate members of the group when one token is processed. This is useful when sending out multiple tokens via email to a single customer or when sending out tokens to multiple customers, but when the vendor wants only one or a predetermined number of tokens to be processed. Therefore when these tokens are used, the other tokens are invalidated, effectively rescinding the offered deal. The vendor server 120 may further be configured to send email notifications that the previously submitted token is now invalid.

The button generator 123 may create cross-client and cross-browser compatible buttons for email checkouts. In one embodiment, the button generator 123 may include the token generator 122 to automatically generate an associated token for each button that is created.

A button and an associated token, generated by the button generator 123 and/or the token generator 122 may be embedded on a web page created by the HTTP server module 121.

The memory 125 may be configured to store information associated with e-commerce transactions. This may include inventory information, information used to generate web pages, customer information, and other e-commerce data.

The payment server 140 may include an HTTP server module 141, a token generator 142, a processor 143, memory 144, payment gateway 145 and a communications unit 146. While only one vendor server 120 is shown communicating with the payment server 140, this is shown as an example only. Payment server 140 may communicate with multiple vendor servers 120. A customer, wishing to use the services of the payment server 140, may register his/her email address and payment information with the payment server 140. Similarly, vendors may register with the payment server 140. The payment server 140 may provide the vendor server 120 with a public key and private key to be used in token transaction in accordance with the methods described herein. When a transaction is attempted, the payment server 140 decodes the token, authenticates the sender of the email, and may process the transaction. While the payment server 140 is depicted as a separate entity in FIG. 1, this is shown as an example only. The payment server 140 may be controlled and/or co-located with the vendor server 120, the banking server 160.

The banking server 160 may be controlled by a third party system bank. The payment server 140 may communicate with the banking server 160 to verify that the customer has adequate funds or credit for the requested purchase. For example, the banking server 160 may be a controlled by VISA, AMERICAN EXPRESS, MASTERCARD or any other bank or banking or financial network that a customer may use for online payment. The banking server 160 may be a server for virtual currencies, such as BITCOIN, etc.

Figure 2:
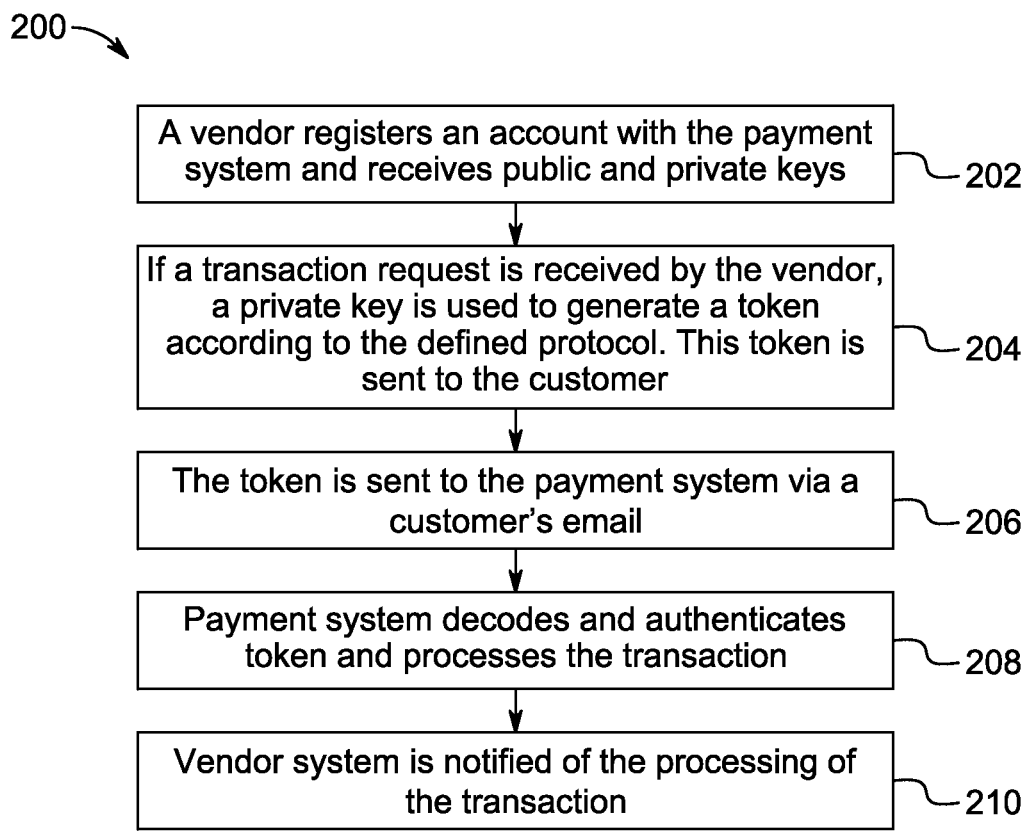
FIG. 2 shows a flow diagram for a vendor setting up an email checkout system for completing a website cart checkout.

FIG. 2 shows a flow diagram for an email checkout for a third party vendor for use with the vendor's website. To enable a customer to complete an email checkout, the vendor registers an account with the payment server 140 and is provided with a public key and a private key (step 202). A customer may access the website and request a financial transaction. This may include purchasing goods, services, or offering a donation. The vendor uses the private key to generate a token according to a defined protocol (step 204). They may do this with any service or library designed to create payment tokens, e.g. proprietary software, such as a RUBY CLIENT. Alternatively, the vendor may request that the payment server 140 generate one or more tokens for use by the vendor. This token is sent to the customer, typically in an email message.

The customer may confirm the transaction by sending a confirmation email, including the token, to the payment server 140 (step 206). The payment server 140 may receive the email to decode the token, authenticates the token and customer's email address and process the transaction (step 208). Processing the transaction may comprise communicating with the customer's banking server 160 to confirm that the customer has the funds to pay for the transaction. The payment server 140 notifies vendor server 120 of the results of the processing (e.g. approved or denied) (step 210). Once the transaction is processed, the vendor server 120 or the payment server 140 may be configured to notify the customer.

Figure 3:
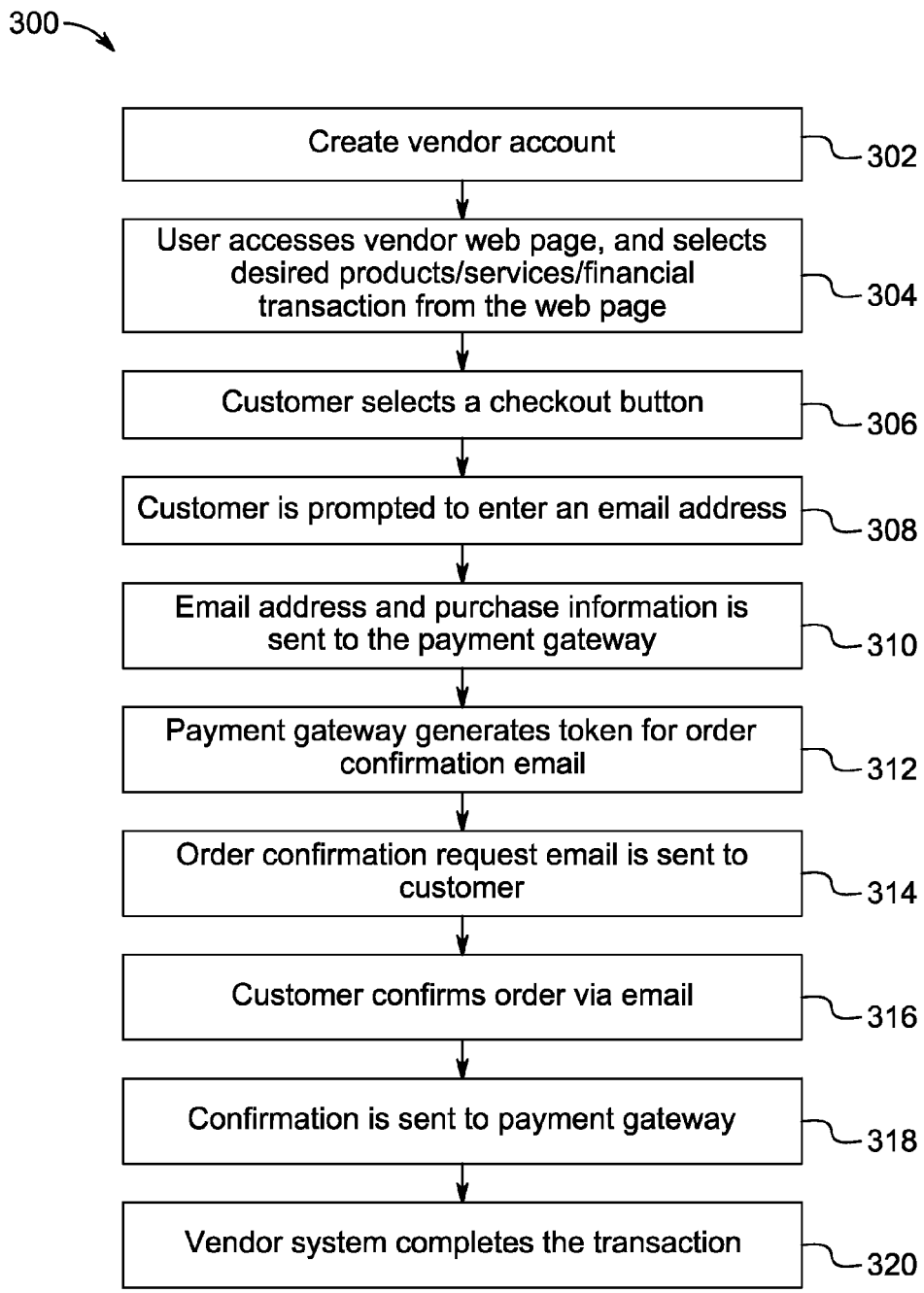
FIG. 3 is a flow diagram for a method of performing email based transaction of a website cart checkout.

FIG. 3 is a flow diagram for a method 300 of performing email checkout from a website. A vendor creates an account with the payment system and receives a private key and public key (step 302). This vendor may present a web page, such as a retail store, a site that sells services, or a charity or non-profit soliciting donations. A customer may access the vendor web page and can then select the desired products/services/financial transaction from the web page (step 304). The customer may continue shopping and repeat step 304.

The customer then provides an input to "checkout" the selected items in the cart (step 306). Often, this will be in the form of a checkout button that is available on the web page. In some instances, for example, for a web page that offers a single service or product, selection of the product/service/financial transaction may automatically take the customer to the checkout stage. The customer is then prompted to enter the customer's email address (step 308). Once the customer's email address is entered, the email address and purchase information is sent, by the vendors' website, to the payment gateway 145 (step 310). The payment gateway 145 generates a token to be embedded in an order confirmation email (step 312).

If the customer has not previously registered with the payment server 140, they may receive an email or web page prompting them to register for the email checkout service. Registration may include entering information such as: name, phone number, payment information, shipping address etc. This information is stored by a memory associated with the payment server 140. For subsequent transactions, when the payment gateway 145 at the payment server 140 receives an email, it may authenticate or invalidate the email address as a transaction from a registered user, (or not). The payment gateway 145 may then send an order confirmation request email directly to the customer (step 314). This email may be a standard text email or it may be an HTML encoded email with clickable portions for different responses. Alternatively, the order confirmation request may be a different type of electronic communication such as a SMS, MMS, a TWEET or a FACEBOOK post. The customer may confirm the order by responding to the email, with a response email (step 316). A confirmation may be sent to the payment gateway 145 (step 318). The payment gateway 145 may then complete the transaction (step 320). Optionally, the vendor server 120 or the payment server 140 may send a confirmation email to the customer and/or a confirmation message may be presented to the customer via the web page.

FIGS. 4-7 and 17-18 show example web pages that may be displayed by the web browser unit 155 of the customer device 150. As will be described in detail below, the web pages may include display elements which allow the user of the customer device 150 to complete checkouts from a website utilizing one or more emails. The web pages may be included in a web browser window that is displayed and managed by the web browser unit 155. The web pages may include data received by the web browser unit 155 from the vendor server 120 and/or the payment server 140. The web pages may include payment transaction information.

The web browser window may include a control area 400 that includes a back button 402, forward button 403, refresh button 404, home button 405, and address field 406. The control area 400 may also include one or more additional control elements, such as bookmark page etc. The user of the customer device 150 may select the control elements in the control area 400. The selection may be performed, for example, by clicking a mouse or providing input via keyboard, touch screen, and/or other type of input device. When one of the control elements is selected, the web browser unit 155 may perform an action that corresponds to the selected element. For example, when the refresh button 404 is selected, the web browser unit 155 may refresh the page currently viewed in the web browser window.

Figure 4:
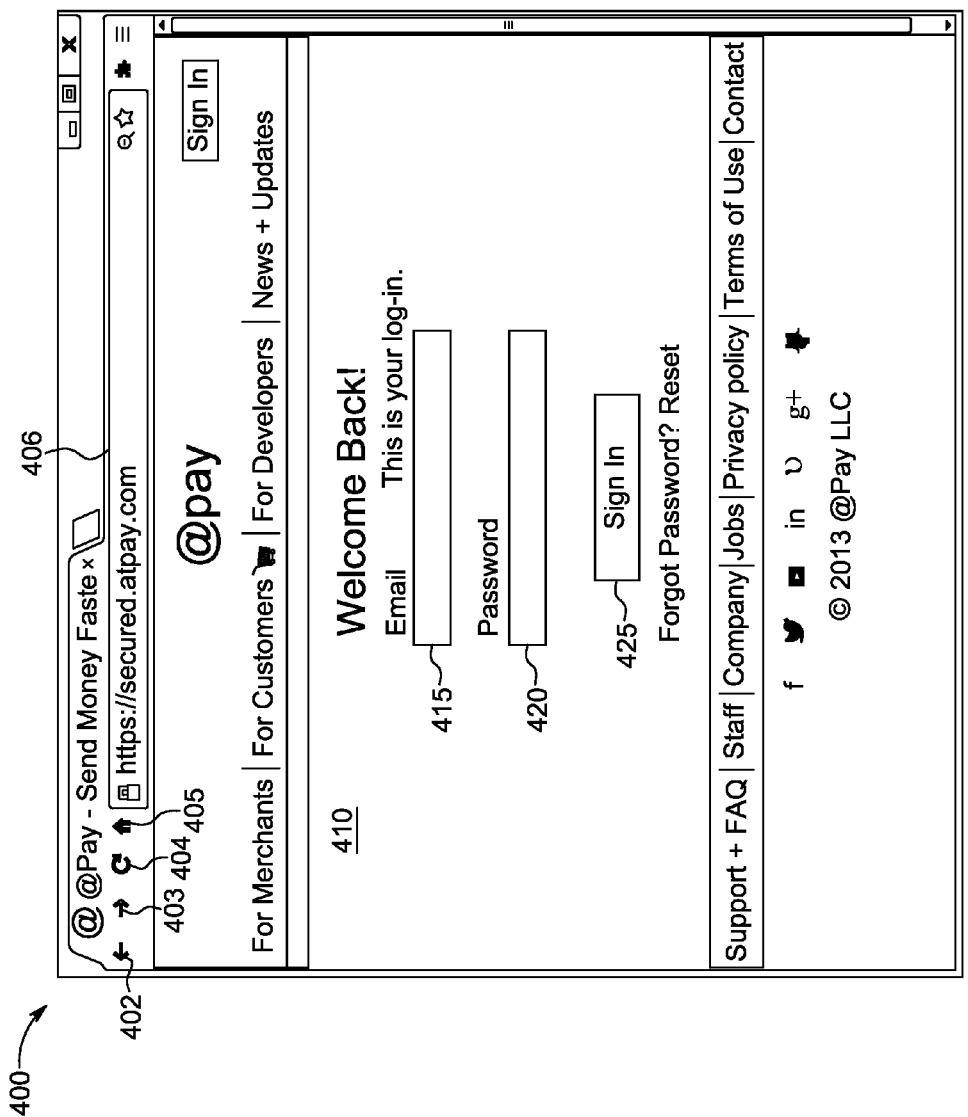
FIG. 4 is an example web page for accessing the payment server.

FIG. 4 is an example web page 410 for accessing the payment server 140. As shown in FIG. 4, the web page may include multiple input fields 415-425. Both vendors and customers may access the payment server 140 to setup their profiles, monitor transaction histories, update payment and contact information etc. A customer may access the web page using a customer device 150, such as a laptop, smartphone, tablet, or other computer. As described above, a first time user of the email checkout system may be taken to the vendor website if an unrecognized email address is submitted from a vendor, an email is received from an unrecognized address or the email address is recognized but some account information needs updating. As the customer device 150 receives input for the input fields 415-425, the web browser unit 155 may store one or more data structures that reflect the selections made in the input fields. Further, as the selections are updated, the web browser unit 155 may update the web page 410 to indicate additional, or more specific, questions that may be associated with the selections.

Figure 5:
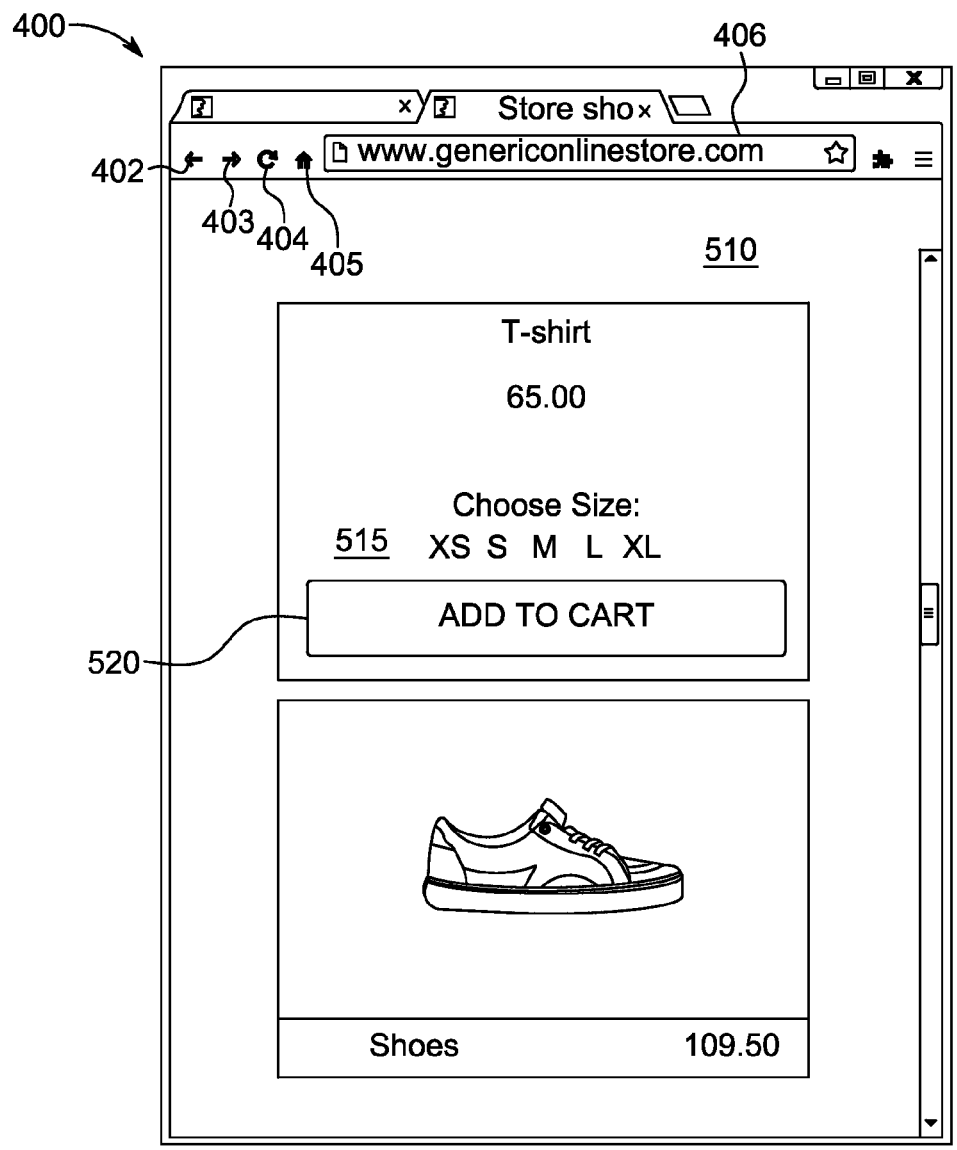
FIG. 5 is an example web page for accessing a vendor website for an email checkout.

FIG. 5 is an example web page 510 for accessing a vendor website. In the example shown, the vendor website retails clothing and related goods. However, this is shown as an example, and the methods and system described herein may be used for any website cart checkout based transactions. As shown in FIG. 5, the web page 510 may include multiple input fields 515-520. The input fields 515-520 may be related to the selections of the types of goods. As the customer device 150 receives input for the input fields 515-520, the web browser unit 155 may store one or more data structures that reflect the selections made in the input fields 515-520. Further, as the selections are updated, the web browser unit 155 may update the web page 510 to indicate additional or more specific questions that may be associated with the selections (e.g. size, color, style for clothing). If there are no errors in the transmission, the web browser unit 155 is directed to a subsequent web page, as will be described hereinafter with reference to FIG. 6.

Figure 6:
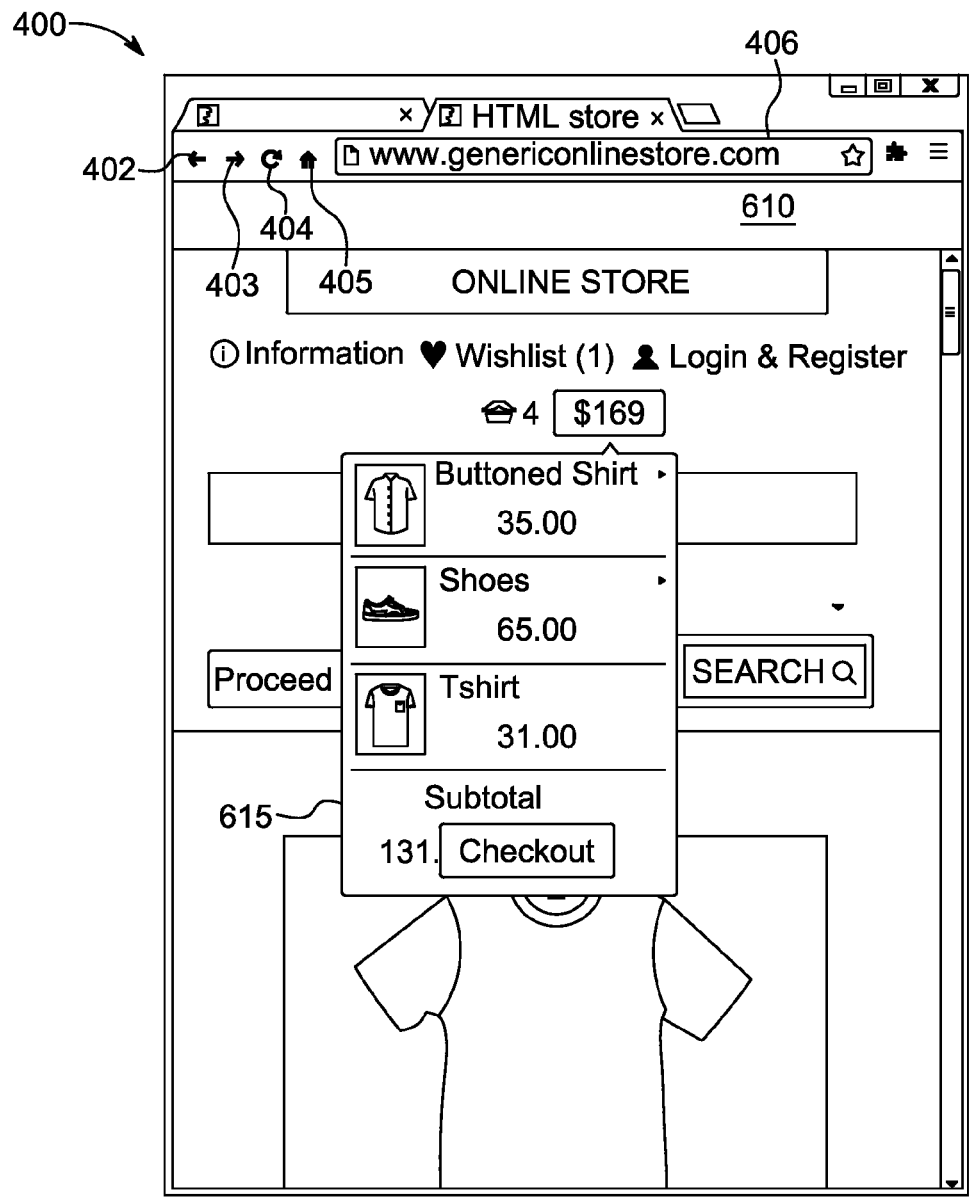
FIG. 6 is an example web page for accessing a vendor website for an email checkout.

FIG. 6 is an example web page 610 for accessing a vendor website. As shown in FIG. 6, the web page may include an input field 615. In the example shown, a customer has selected multiple shirts and a pair of shoes for purchase. The customer can continue shopping and adding additional items to the cart, or the customer may select "CHECKOUT" in input field 615. As the customer device 150 receives input for the input field 615, the web browser unit 155 may store one or more data structures that reflect the selections made in the input field(s) 615. Further, as the selections are updated, the web browser unit 155 may update the web page 610 to indicate additional questions that may be associated with the selections (e.g. quantity). At any time, while viewing the web page of FIG. 6, the user may select CHECKOUT in input field 615 to move to the checkout cart. If there are no errors in the transmission, the web browser unit 155 is directed to a subsequent web page, as will be described hereinafter with reference to FIG. 7.

Figure 7:
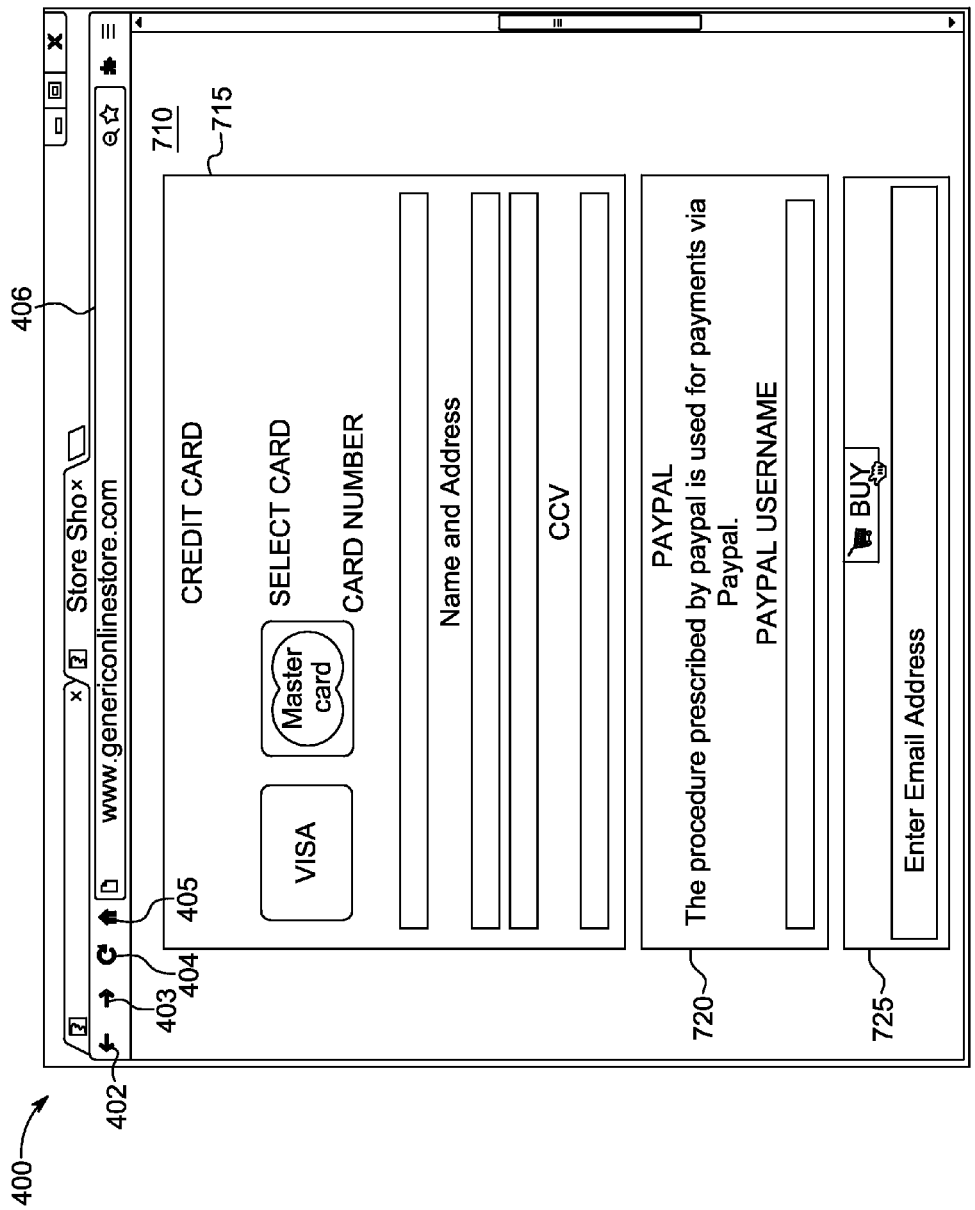
FIG. 7 is an example web page for accessing a vendor website for an email checkout.

FIG. 7 is an example web page 710 for accessing a vendor website. As shown in FIG. 7, the web page 710 may include multiple input fields 715-720. In the example shown, the customer has previously selected multiple goods to purchase via a vendor's website. The customer has now selected checkout to proceed to payment for the goods. As shown in FIG. 7, the customer may be presented with multiple options for completion of the transaction by paying for the goods. The customer may pay by manually entering credit card information, which requires entry of information each time a purchase is requested. This is cumbersome and frustrating for users, particularly when attempted on a mobile device, whereby small keys are susceptible to user error. The customer may pay using other proprietary services, such as PAYPAL, or other similar payment services.

Alternatively, the customer may use the email checkout system as described herein. To pay using the email checkout system, the customer enters an email address and selects the "BUY" button in input field 725. As the customer device 150 receives input for the input fields 715-725, the web browser unit 155 may store one or more data structures that reflect the selections made in the input fields 715-725. Further, as the selections are updated, the web browser unit 155 may update the web page 710. If there are no errors in the transmission, the web browser unit 155 may be directed to a subsequent web page that may include a confirmation of the request (not pictured) and the vendor server 120 sends a purchase request to the payment server 140. The purchase request may include the customer's email address, information associated with the items in the cart, and a token associated with the vendor, and or a vendor ID. In another embodiment, the web page 610 may use cookies to identify the user, accordingly, when the user selects BUY in input field 725, the website 610 may automatically fill in the customer's email address. Similarly, if the customer device 150 is a smartphone or tablet accessing the vendor server 120 via an app, the app may be configured to store and automatically enter or transmit the customer's email address.

While the example shown in FIG. 7 directs the customer to input the customer email address on the same page as the "BUY" button in input field 725, in practice the customer's email address may be input in a number of suitable ways. For example, the customer's email address may be input directly on the page where the merchandise is advertised, such as web page 510. The customer may also be able to enter the customer email address next to each item within the shopping cart (and similarly a wish list) or the whole shopping cart. Alternatively, the customer may select the "BUY" button in input field 725, as shown in FIG. 7, but be taken to a separate web page on which to enter the customer's email address.

Figure 8:
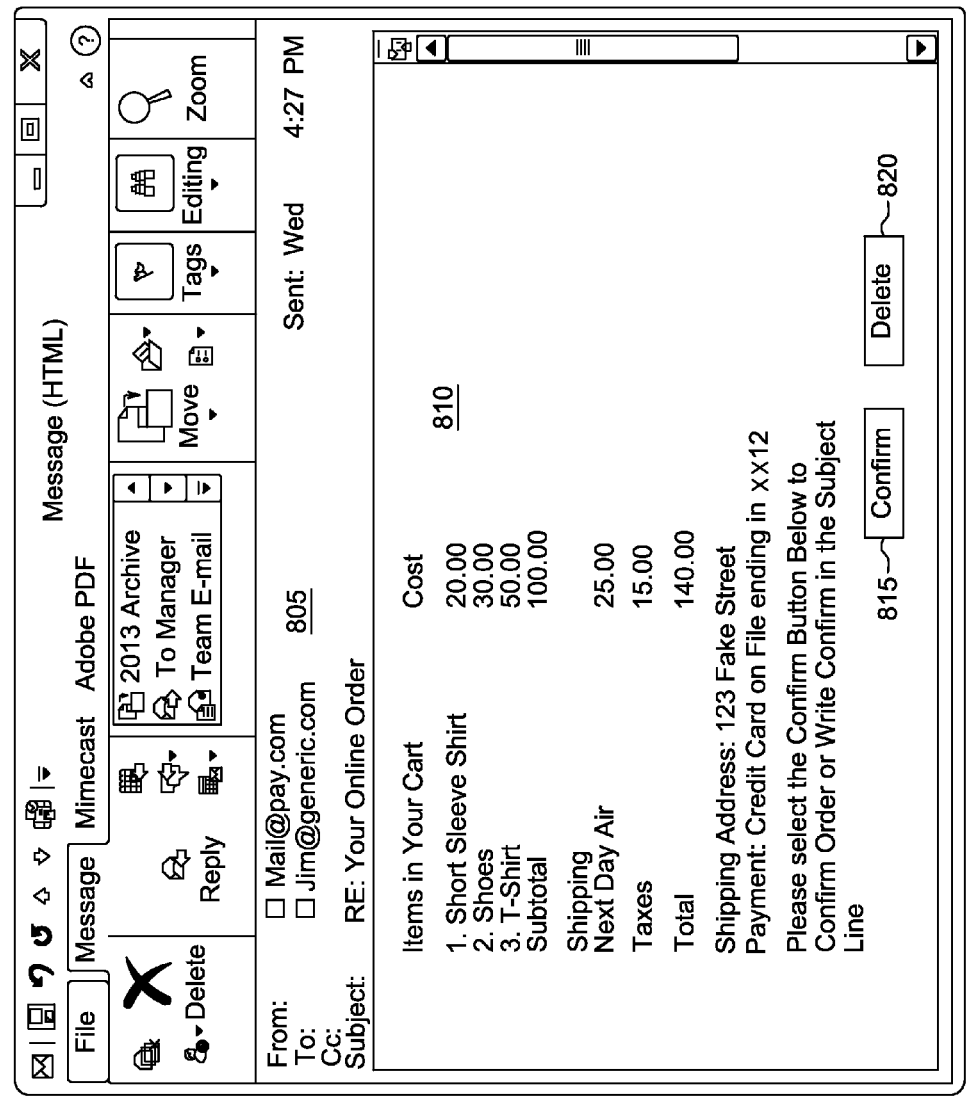
FIG. 8 shows a confirmation request email message generated in response to the purchase request.

FIG. 8 shows a confirmation request email message 800 generated in response to the purchase request. Once the payment server 140 receives the purchase request, and the email address is authenticated (or registered) as the email address of a registered user, the payment server 140 sends a confirmation request email message to the customer's email address. The confirmation request email message 800 may include a plurality of fields, including an address field 805, a message field 810, and one or more input fields 815-820.

In the example shown in FIG. 8, the confirmation request email message 800 is an HTML encoded email with two input fields 815-820. The input fields solicit input from the user to confirm or delete the order. The input fields 815-820 are coded with information to automatically generate confirmation email messages, to confirm or delete a purchase request. Input fields 815-820 may be encoded with a mailto hyperlink that included an embedded token.

Figure 9:
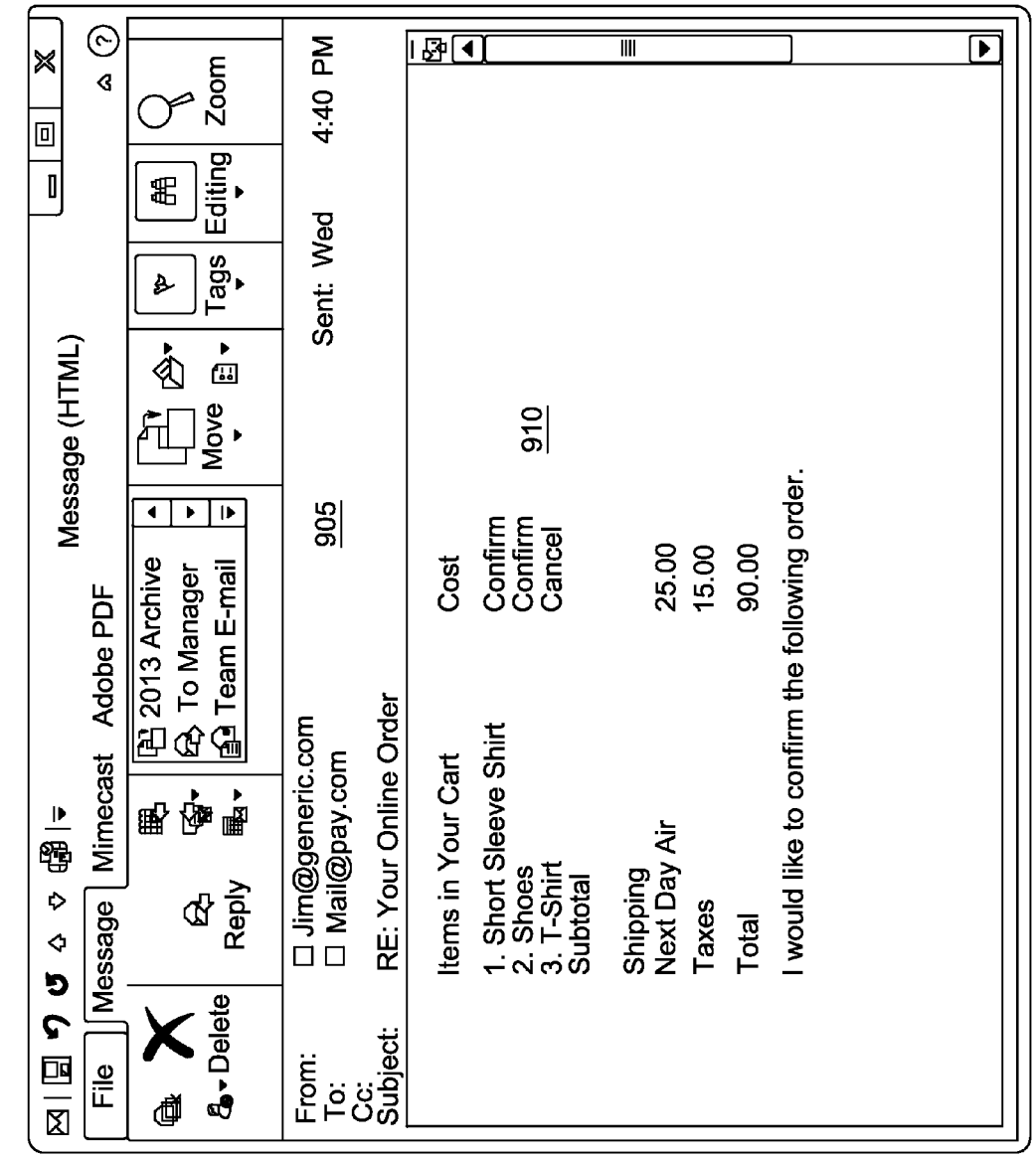
FIG. 9 shows a confirmation email message, generated in response to the confirmation request email message.

FIG. 9 shows a confirmation email message 900, generated in response to the confirmation request email message 800 shown in FIG. 8. The confirmation email message 900 may include a plurality of fields, including an address field 905 and message field 910. In the example shown in FIG. 9, the user has selected the confirm button 815 of FIG. 8. The address field 905 is automatically generated and the customer may enter "confirm" or "cancel" for each individual item in message field 910. This confirmation email message 900 contains an embedded token that allows payment server 140 to process the transaction. The customer, using a customer device 150 may then send this confirmation email message 900 back to the payment server 140. Because the token may be encoded with the pricing information, the payment server 140 may be configured to compare the message field 910 with the pricing information encoded in the token to determine the value of the transaction.

Figure 10:
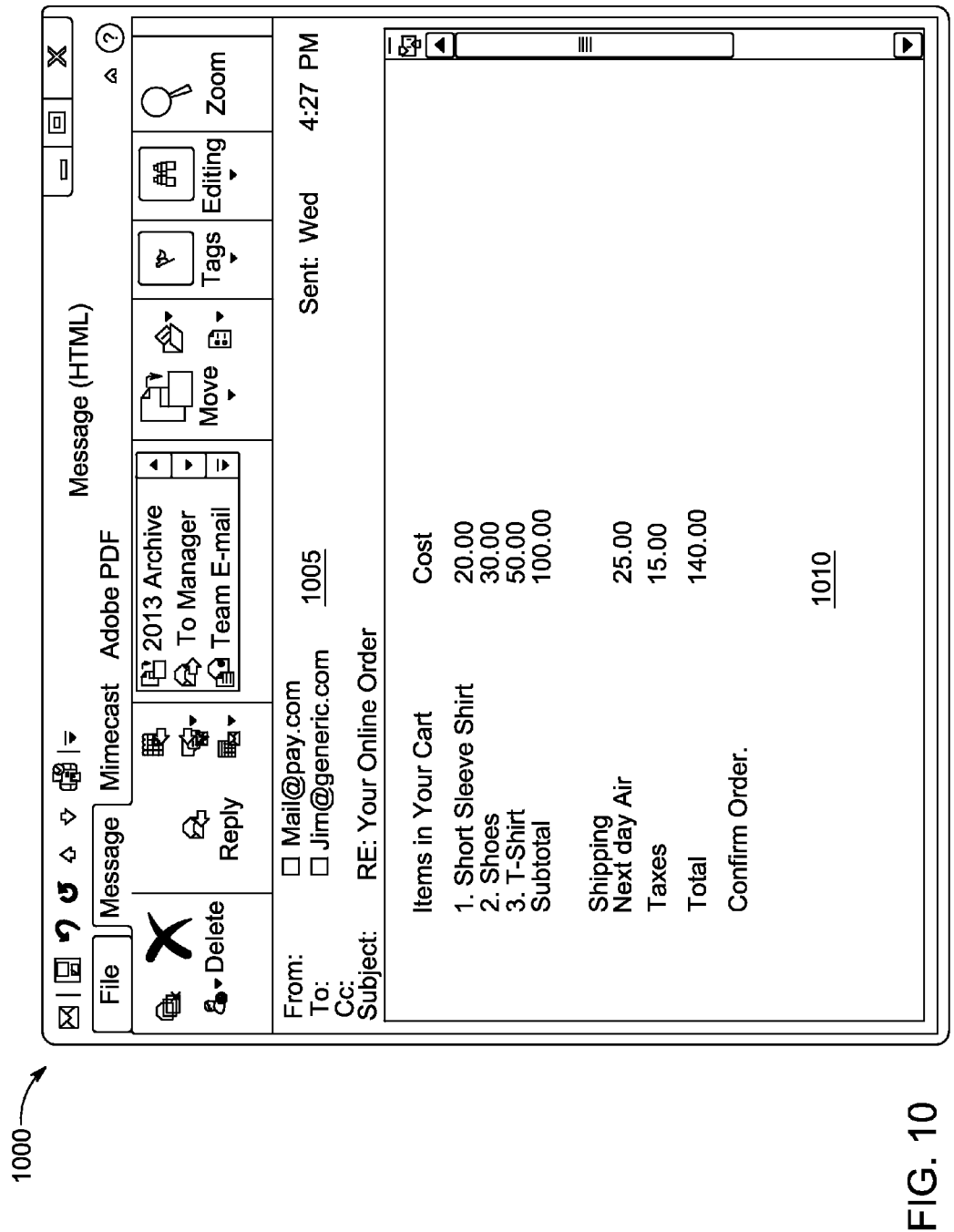
FIG. 10 shows another example of a confirmation email message, generated in response to the confirmation request email message.

FIG. 10 shows another example of a confirmation email message 1000, generated in response to the confirmation request email message 800 of FIG. 8. The confirmation email message 1000 may include a plurality of fields, including an address field 1005 and message field 1010. In this example, in response to the confirm button 815, the automatically generated email created a confirmation email message 1000 that confirms the order. In this example, the user is not allowed to adjust the line items of the order. The customer, using a customer device 150 may then send this confirmation email message 1000 back to the payment server 140.

Once the confirmation email message is received by the payment server 140, the vendor server 120 decodes the incoming email, determines whether it is a valid payment attempt from a registered customer, and sends the transaction on to the customer's financial infrastructure (e.g. banking server 160). The customer's financial infrastructure may comprise the client's payment processor (service that actually processes the payment), merchant account (bank account that the funds are deposited to), and their fulfillment system (including receipts and/or product shipment). The payment server 140 sends a message to the vendor server 120 to complete the transaction.

This email checkout system may be compatible with any website where software based plug-in has been installed on the website. The software based plug-in may include code necessary to generate tokens and buttons. The payment server 140 allows the vendor server 120 to send emails as needed to encourage the customer to complete the transaction easily using the email checkout system 100. Additionally, the customer may have recurring purchases or recurring goods, or other expenses (e.g. utilities, phone bill, memberships). The customer may not be comfortable allowing a vendor to automatically deduct funds from their account. Accordingly, the payment server 140 may be configured to transmit a confirmation for recurring bills, according to a customer's preference settings.

Figure 11:
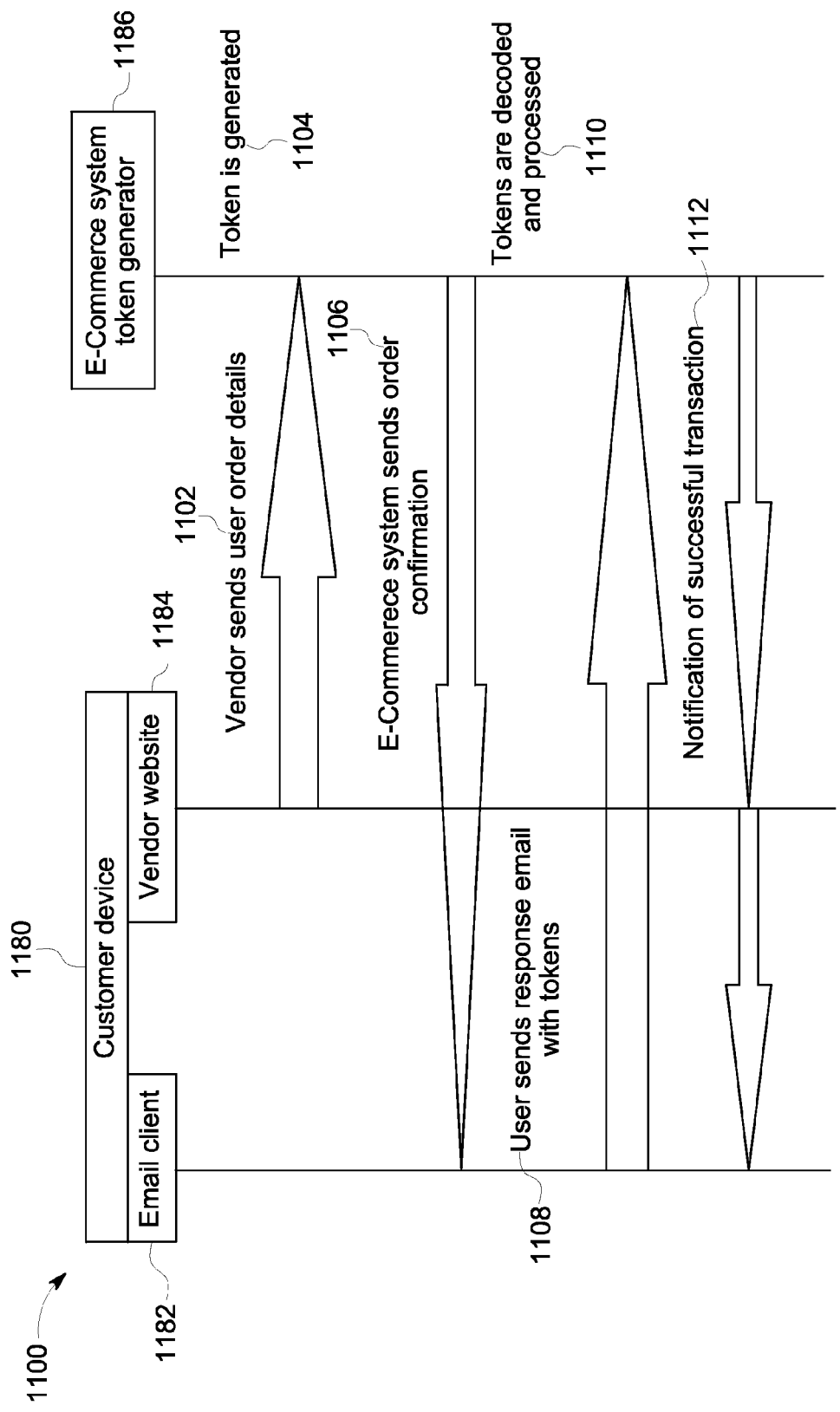
FIG. 11 shows a transaction diagram for a method for email checkout where the token is generated by an E-commerce system.

FIG. 11 shows a transaction diagram for a method 1100 for email checkout where the token is generated by an E-commerce system 1186. A customer, using a customer device 1180 may request the purchase of some items from a vendor website 1184. In response to this order, the vendor website 1184 sends order details to the e-commerce system 1186 (step 1102). The order details may include the vendor ID, the items ordered and price for each item, and the customer's email address. The e-commerce system 1186 may be, for example, payment server 140, banking server 160, or any system equipped to decode and facilitate payment using tokens. The e-commerce system 1186 may then generate a token for the customer for the transaction (step 1104). The e-commerce system may send an order confirmation email to the customer's email address (step 1106). The customer may access this email by using a customer device 1180 that is capable of communicating with an email client (1182). The customer, through the email client 1182, may send a response email that confirms, cancels or modifies the order to the e-commerce system 1186 (step 1108). This email is embedded with a token. The e-commerce system 1186 receives the email, decodes the token, authenticates the sender, and processes the order (step 1110). The e-commerce system 1186 may then send a notification of the transaction to the vendor website 1184 (step 1112). The e-commerce system 1186 may also notify the customer of the transaction, based on the customer's notification settings. For example, the notification may be via an email to the customer's email address, or for security reasons it may be to another email address, or by SMS, MMS, or any other electronic medium.

Figure 12:
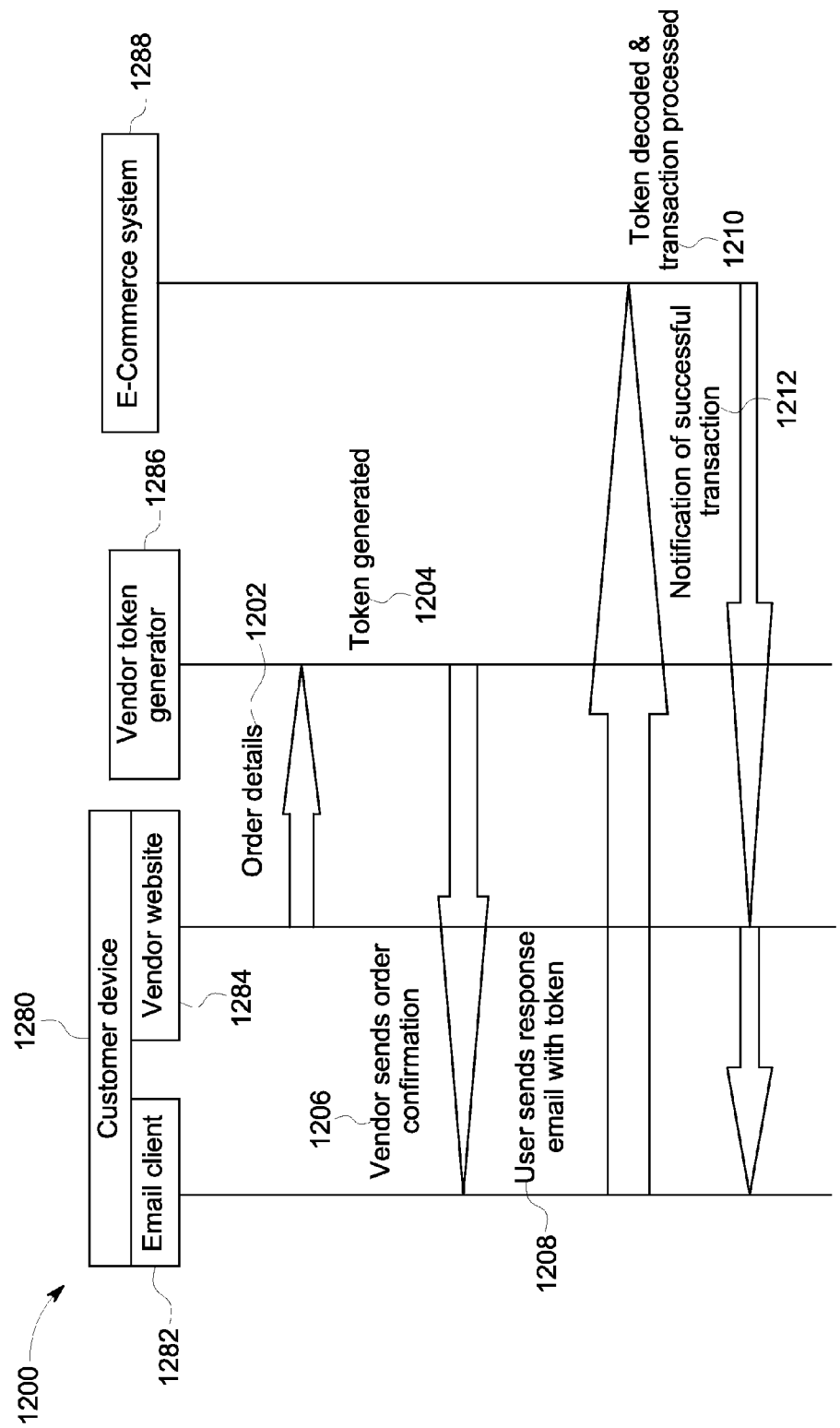
FIG. 12 shows a transaction diagram for a method for email checkout where the token is generated the vendor or another that has been provided with the vendor's private key.

FIG. 12 shows a transaction diagram for a method 1200 for email checkout where the token is generated the vendor or another party that has been provided with the vendor's private key. A customer, using a customer device 1280 may request the purchase of one or more items. In response to this order, the vendor website 1284 sends order details to the vendor token generator 1286 (step 1202). The order details may include the items ordered and price for each item, and the customer's email address. The vendor token generator 1286 may then generate a token for the customer for the transaction (step 1204). The vendor token generator 1286 may send an order confirmation email to the customer's email address 1206. The customer may access this email by using a customer device 1280 that is capable of communicating with an email client 1282. The customer, through the email client 1282, may send a response email that confirms, cancels or modifies the order to the e-commerce system 1288 (step 1208). This email is embedded with a token. The e-commerce system 1288 receives the email, decodes the token, authenticates the sender, and processes the order (step 1110). The e-commerce system 1288 may then send a notification of the transaction to the vendor website 1284 (step 1112). The e-commerce system 1288 may also notify the customer of the transaction, based on the customer's notification settings. For example, the notification may be via an email to the customer's email address, or for security reasons it may be to another email address, or by SMS, MMS, or any other electronic medium.

In another embodiment (not shown) a token may be generated by the e-commerce site, and may be transmitted to the vendor, allowing the vendor to send the confirmation email customer. Alternatively, the vendor may generate the token and send it to the e-commerce site to send the confirmation email to the customer.

Figure 13:
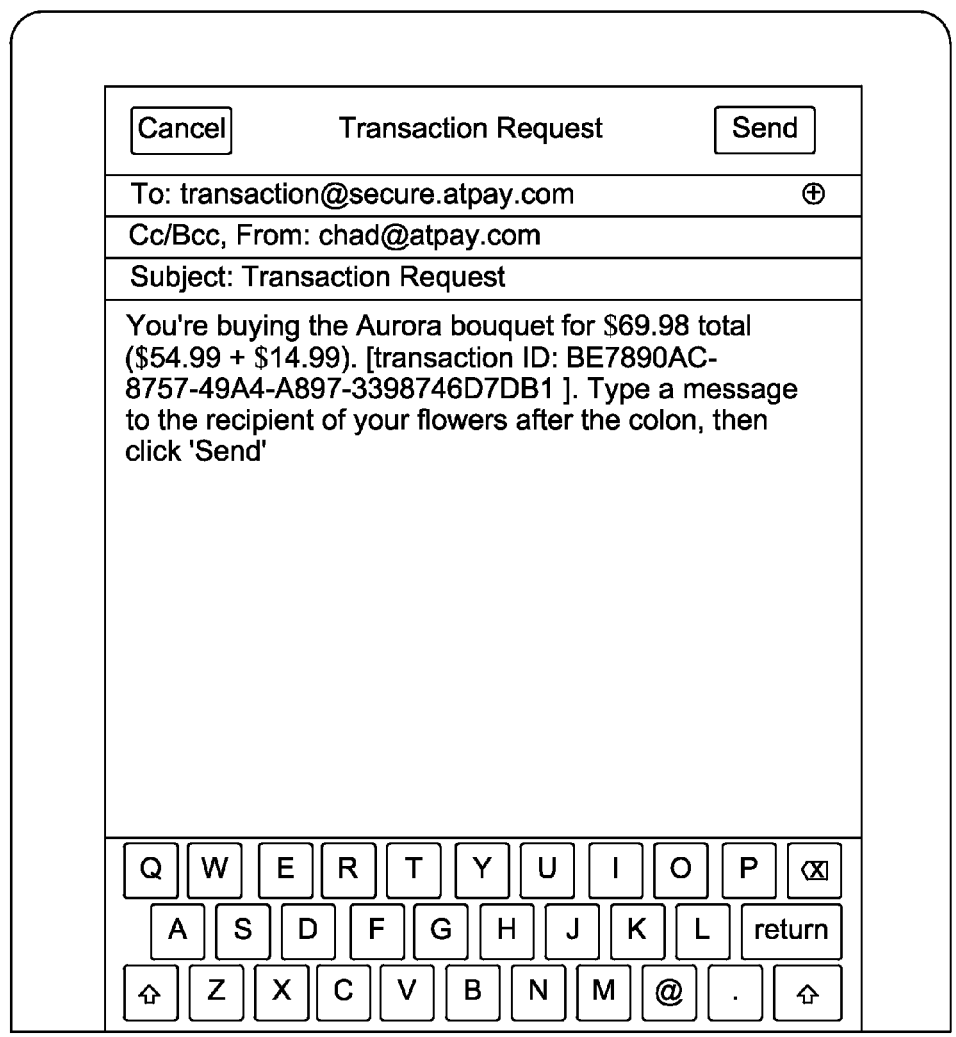
FIG. 13 shows a tablet that may be used to implement features described above.

FIG. 13 shows an example wherein the customer device 150 of FIG. 1 is a tablet device 1300 that may be used to implement features described above. The tablet device 1300 may include a processor, memory, communication interface, peripheral device interface, and a touch screen display. The tablet device 1300 may perform the email checkout methods described herein.

As shown in FIG. 13, the token is embedded in the body of the email message. This is shown as an example only. The token may be embedded in any portion of the email, including, but not limited to, the "To" field and "Cc/Bcc" fields via the email addresses entered, the Subject field, as well as in headers that are not seen by the user. Additionally, the token may be sent as an attachment to an email and/or as an encrypted image, or may be otherwise invisible to the user by formation with colors, etc.

The memory may be or include a device such as a Dynamic Random Access Memory (D-RAM), Static RAM (S-RAM), or other RAM or a flash memory, hard disk, a magneto-optical medium, an optical medium such as a CD-ROM, a digital versatile disk (DVDs), or Blu-Ray disc (BD), or other type of device for electronic data storage.

The communication interface may be, for example, a communications port, a wired transceiver, a wireless transceiver, and/or a network card. The communication interface may be capable of communicating using technologies such as Ethernet, fiber optics, microwave, xDSL (Digital Subscriber Line), Wireless Local Area Network (WLAN) technology, wireless cellular technology, Bluetooth technology and/or any other appropriate technology.

The peripheral device interface may be an interface configured to communicate with one or more peripheral devices. The peripheral device interface may operate using a technology such as Universal Serial Bus (USB), PS/2, Bluetooth, infrared, serial port, parallel port, and/or other appropriate technology. The peripheral device interface may, for example, receive input data from an input device such as a keyboard, a mouse, a trackball, a touch screen, a touch pad, a stylus pad, and/or other device. Alternatively or additionally, the peripheral device interface may communicate output data to a printer that is attached to the computing device via the peripheral device interface.

The display may be a touchscreen display. The display may receive display data from the processor.

Figure 14:
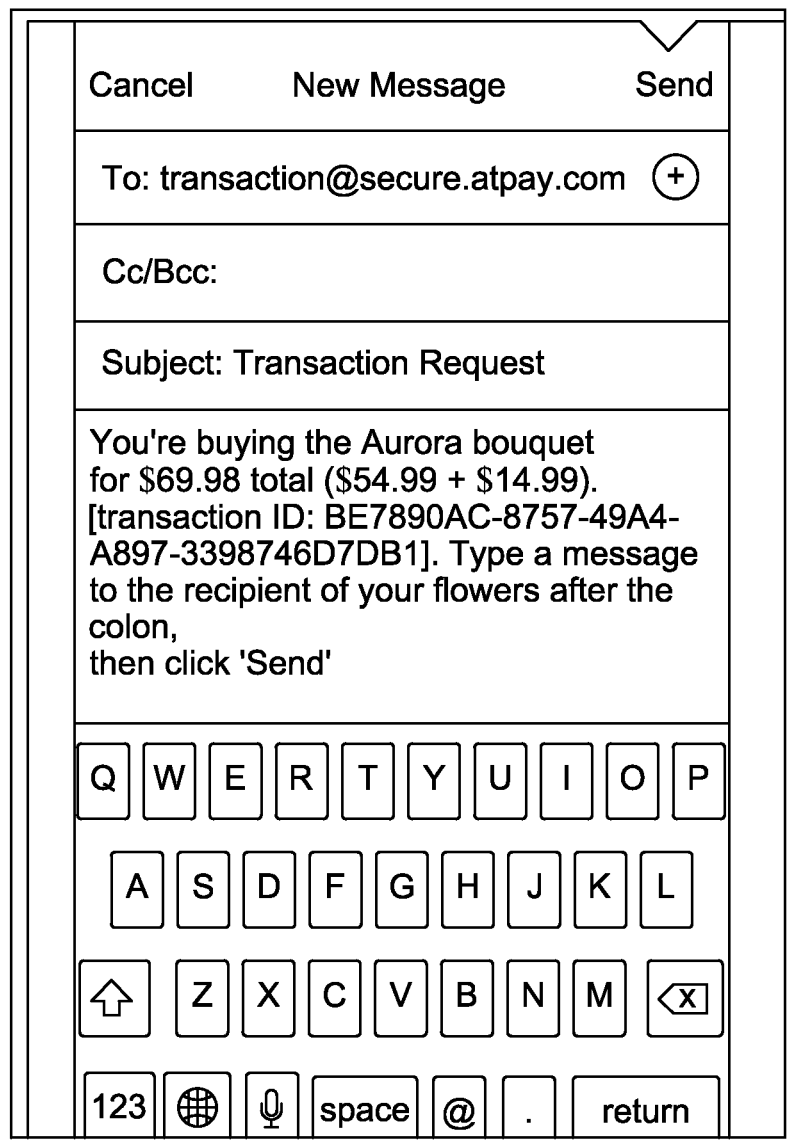
FIG. 14 shows a smartphone that may be used to implement features described above.

FIG. 14 shows an example wherein the customer device 150 of FIG. 1 is a smartphone 1400 that may be used to implement features described above. The mobile phone may include a processor, memory, communication interface, peripheral device interface, and a touch screen display. The smartphone 1400 may perform the email checkout methods described herein.

The memory may be or include a device such as a Dynamic Random Access Memory (D-RAM), Static RAM (S-RAM), or other RAM or a flash memory, hard disk, a magneto-optical medium, an optical medium such as a CD-ROM, a digital versatile disk (DVDs), or Blu-Ray disc (BD), or other type of device for electronic data storage.

The communication interface may be, for example, a communications port, a wired transceiver, a wireless transceiver, and/or a network card. The communication interface may be capable of communicating using technologies such as Ethernet, fiber optics, microwave, xDSL (Digital Subscriber Line), Wireless Local Area Network (WLAN) technology, wireless cellular technology, Bluetooth technology and/or any other appropriate technology.

The peripheral device interface may be an interface configured to communicate with one or more peripheral devices. The peripheral device interface may operate using a technology such as Universal Serial Bus (USB), PS/2, Bluetooth, infrared, serial port, parallel port, and/or other appropriate technology. The peripheral device interface may, for example, receive input data from an input device such as a keyboard, a mouse, a trackball, a touch screen, a touch pad, a stylus pad, and/or other device. Alternatively or additionally, the peripheral device interface may communicate output data to a printer that is attached to the computing device via the peripheral device interface.

The display may be a touchscreen display. The display may receive display data from the processor.

Figure 15:
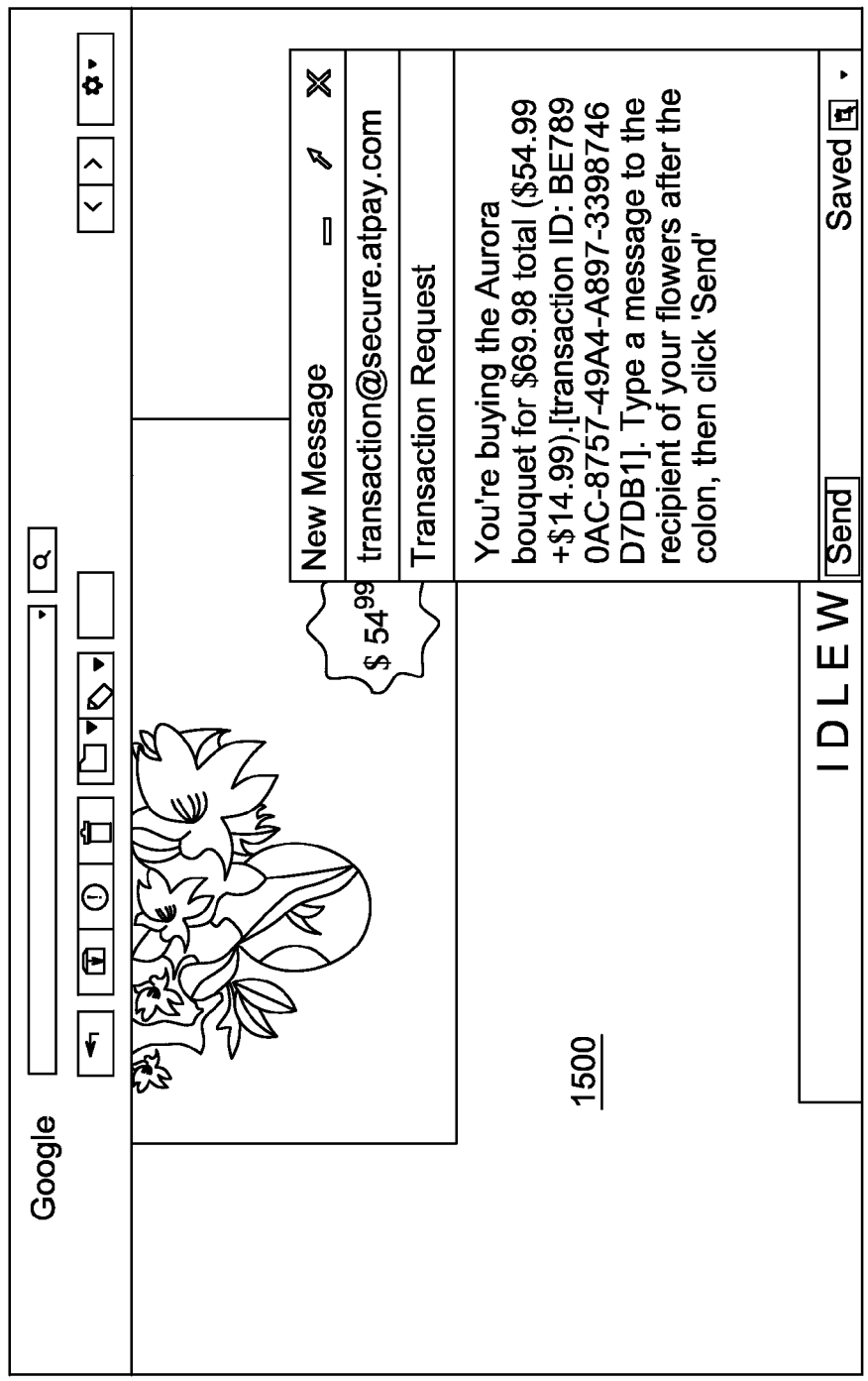
FIG. 15 shows a personal computer that may be used to implement features described above.

FIG. 15 shows an example wherein the customer device 150 of FIG. 1 is a personal computer 1500 that may be used to implement features described above. The personal computer 1500 shown in FIG. 15 is a laptop computer. The laptop computer may include a processor, memory, communication interface, peripheral device interface, a keyboard, and a display. As shown in FIG. 15, the method for email checkout may be used with any email client. It may be an email client resident on the customer device 150 or a web based email client as shown in FIG. 15.

The memory may be or include a device such as a Dynamic Random Access Memory (D-RAM), Static RAM (S-RAM), or other RAM or a flash memory, hard disk, a magneto-optical medium, an optical medium such as a CD-ROM, a digital versatile disk (DVDs), or Blu-Ray disc (BD), or other type of device for electronic data storage.

The communication interface may be, for example, a communications port, a wired transceiver, a wireless transceiver, and/or a network card. The communication interface may be capable of communicating using technologies such as Ethernet, fiber optics, microwave, xDSL (Digital Subscriber Line), Wireless Local Area Network (WLAN) technology, wireless cellular technology, Bluetooth technology and/or any other appropriate technology.

The peripheral device interface may be an interface configured to communicate with one or more peripheral devices. The peripheral device interface may operate using a technology such as Universal Serial Bus (USB), PS/2, Bluetooth, infrared, serial port, parallel port, and/or other appropriate technology. The peripheral device interface may, for example, receive input data from an input device such as a keyboard, a mouse, a trackball, a touch screen, a touch pad, a stylus pad, and/or other device. Alternatively or additionally, the peripheral device interface may communicate output data to a printer that is attached to the computing device via the peripheral device interface.

Figure 16:
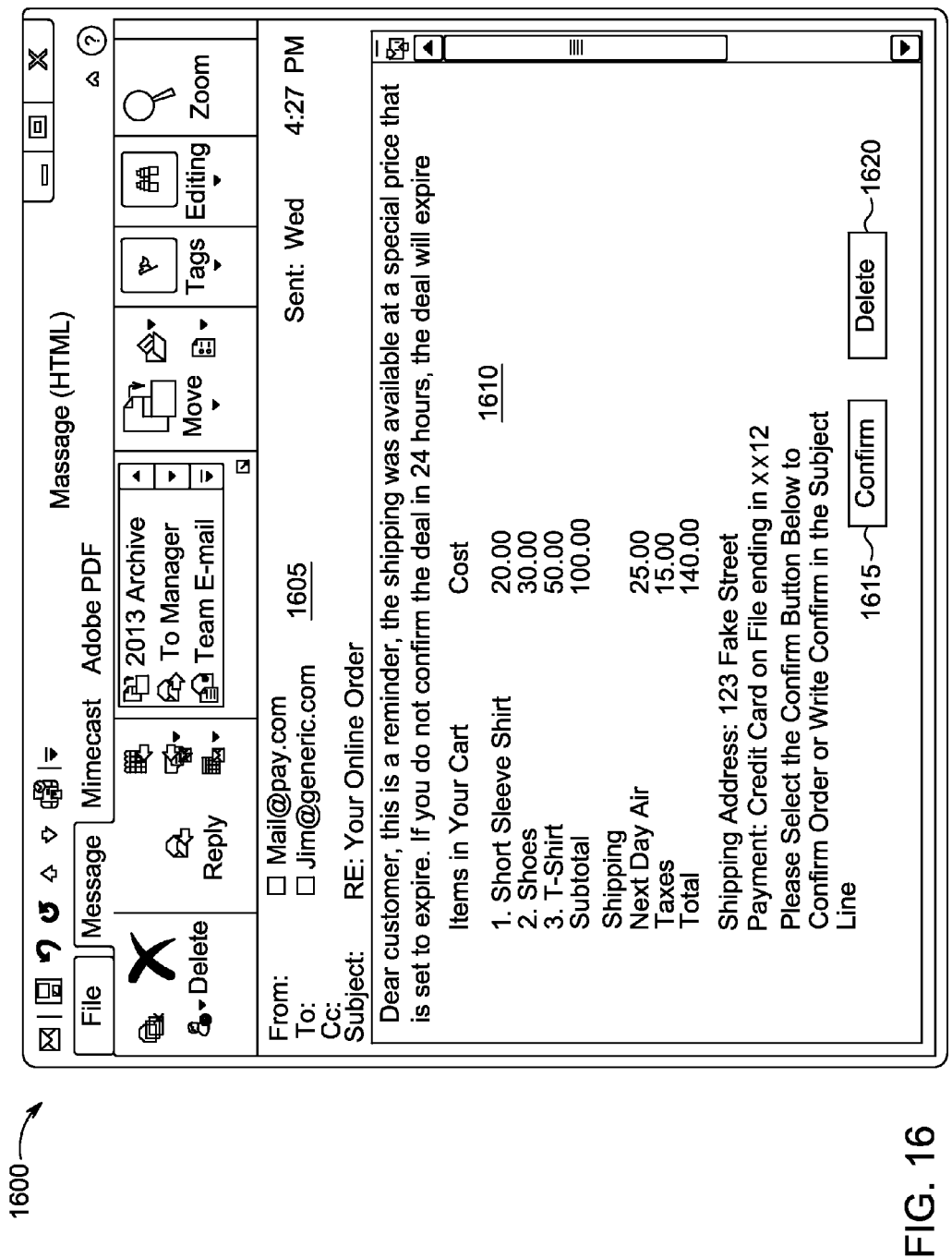
FIG. 16 shows a follow-up confirmation request email message generated in response to an outstanding purchase request.

FIG. 16 shows a follow-up confirmation request email message 1600 generated in response to an outstanding purchase request. The follow-up confirmation request email message 1600 may be sent by the payment server 140 or the vendor server 120 based on predetermined conditions. The predetermined conditions may include a change in the price of goods or services offered, a change in availability of inventory, or an elapsed time from transaction request. Additionally, a change in the expiration of the token may trigger the transmission of a follow-up confirmation request email message 1600. The follow-up confirmation request email message 1600 may include a plurality of fields, including an address field 1605, a message field 1610, and one or more input fields 1615-1620.

In the example shown in FIG. 16, the vendor is able to take advantage of asynchronous transaction capabilities of an email checkout. As discussed above, the vendor may keep an offer available for a customer and remind the customer of any changes in status of the goods. From the perspective of the customer, they may initialize a transaction, but hold off completing the transaction until a date of their choosing. The follow-up confirmation request email message 1600 is an HTML encoded email with two input fields 1615-1620. The input fields solicit input from the user to confirm or delete the order. The input fields 1615-1620 are coded with information to automatically generate confirmation email messages, to confirm or delete a purchase request.

Figure 17:
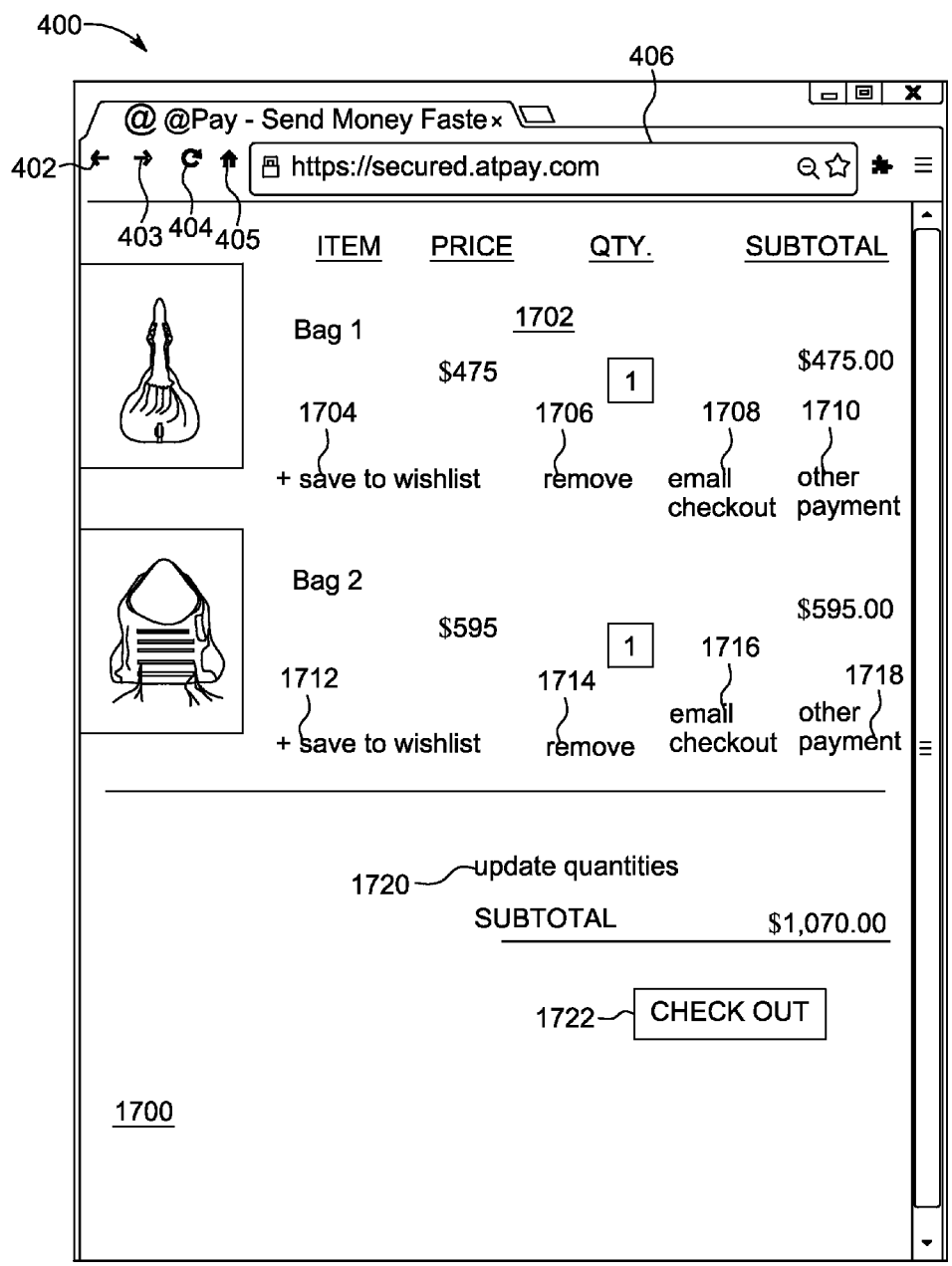
FIG. 17 is an example web page 1700 for accessing a vendor website.

FIG. 17 is an example web page 1700 for accessing a vendor website. As shown in FIG. 17, the web page 1700 may include multiple input fields 1702-1722. In the example shown, the customer has previously selected multiple goods to purchase via a vendor's website. The customer is now viewing a shopping cart. As shown in FIG. 17, the customer may be presented with multiple options for completion of the transaction by paying for the goods. The customer may continue with a traditional checkout, by selecting CHECKOUT in input field 1722. The customer may move each item to their wishlist, by selecting input fields 1704 and 1712. The customer may remove an item from the shopping cart by selecting input field 1706 or 1714. The customer may complete email checkout of each item by selecting input fields 1708 and 1716. This allows the customer to purchase, for example, some goods via their personal credit card using email checkout and other goods via a corporate account. The customer may individually purchase each good via another payment method by selecting input fields 1710 and 1718. If the customer has updated the quantity, e.g. by entering a new value in input field 1702, the customer can receive an updated total by selecting input field 1720.

Figure 18:
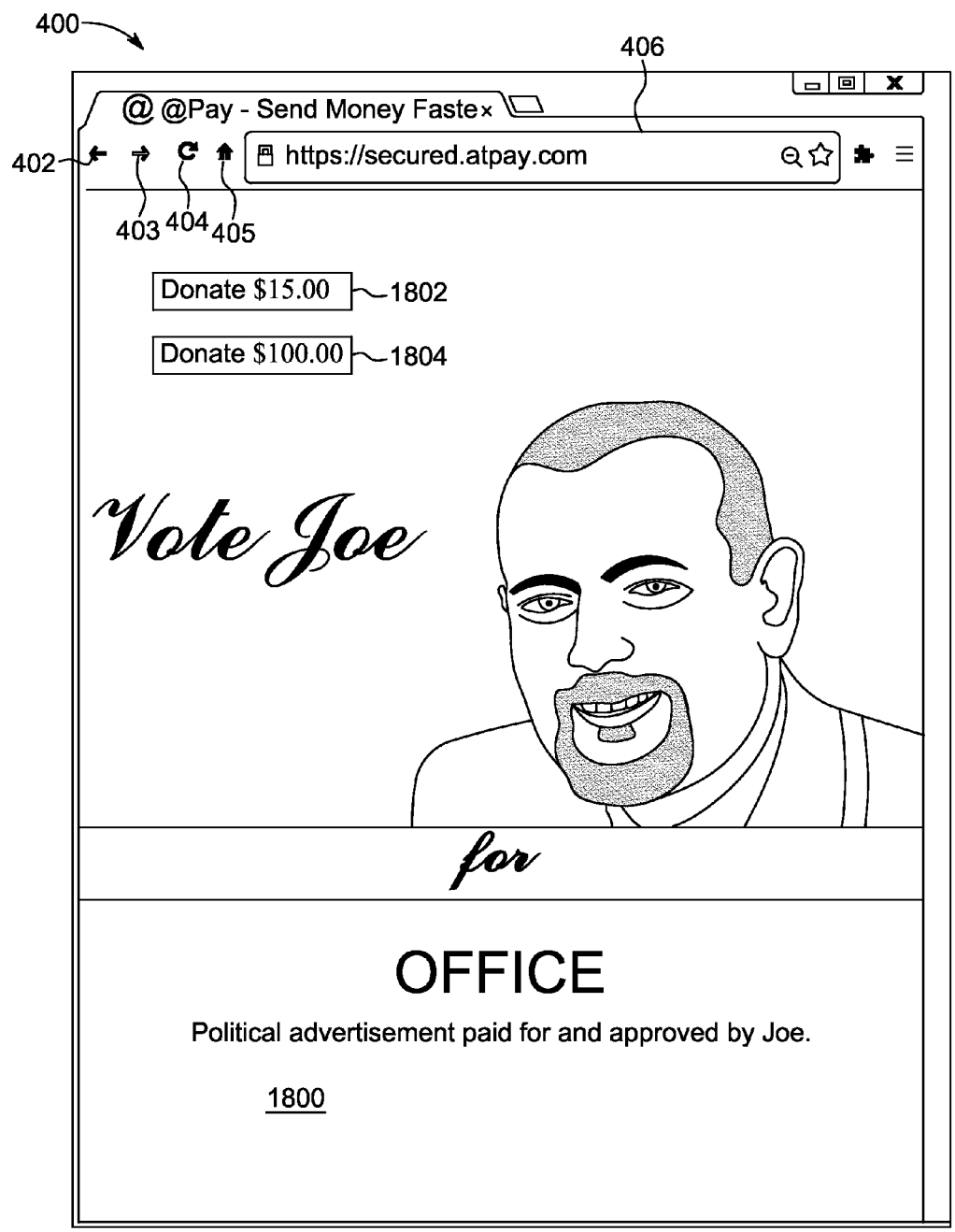
FIG. 18 is an example web page 1800 for accessing a vendor website, wherein the vendor is a political campaign.

FIG. 18 is an example web page 1800 for accessing a vendor website, wherein the vendor is a political campaign. As shown in FIG. 18, the web page 1800 may include multiple input fields 1802-1804 for soliciting campaign contributions. In the example shown, the web page 1800 includes two contribution levels, but this is as an example only, there may be any number of contribution levels. A customer may select one of the donation levels by selecting input fields 1802 or 1804. By selecting input fields 1802 or 1804, the customer device 150 sends a communication to the vendor server 120. If there are no errors in the transmission, the web browser unit 155 may be directed to a subsequent web page that may include a confirmation of the request (not pictured) and the vendor server 120 sends a purchase request to the payment server 140. The purchase request may include the customer's email address, information associated with the items in the cart, and a token associated with the vendor, and or a vendor ID. In response, the payment server 140 may send a confirmation email, similar to the example shown in FIG. 8.

As shown in FIG. 1, payment gateway 145 is located at the payment server 140 and payment gateway 126 is located at the vendor server 120 In another embodiment, the payment gateway may be a separate entity that directly connects with payment processors, such as banking server 160. Wherein the payment gateway may handle the credit card data, authorize credit card payments, and securely pass info between a payment portal and the processor. In this embodiment, the payment server 140 may serves as a step before the payment gateway.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or Bluray-Disc, or other type of device for electronic data storage.

Although the methods and features described above with reference to FIGS. 2-18 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-18 may be used alone without the other features and elements or in various combinations with or without other features and elements. Sub-elements of the methods and features described above with reference to FIGS. 1-18 may be performed in any arbitrary order (including concurrently), in any combination or sub-combination.

What is claimed is:

1. A secure email checkout system for communicating between a customer device, a vendor website and a payment server, the system utilizing at least two emails to complete payment for at least one item to be purchased on the vendor website, the system comprising:
   the payment server comprising:
     a computer memory, operably connected to a processor, configured to store customer information, the customer information including a customer name, customer email address, customer shipping address, and customer billing information;
     a receiver, operably connected to the processor, configured to receive a request for a purchase from the vendor website, the request for purchase including an email address and transaction information regarding the at least one item to be purchased, the transaction information including at least an identification and price of the at least one item to be purchased;
     the processor configured to determine whether the received email address matches the customer email address stored in the computer memory;
     a transmitter, operably connected to the processor, configured to transmit a first email to the customer email address requesting authorization to complete a purchase of the at least one item including the transaction information, wherein the first email includes a mailto link that is encoded with a token; whereby selection of the mailto link by the customer generates a second email from the customer email address which includes the token;
     the receiver further configured to receive the second email, from the customer email address, the second email confirms at least a portion of the purchase and cancels at least a portion of the purchase;
     the processor further configured to authenticate the second email using the customer email address and the token; and in response to a valid result of the authentication, the processor completes a payment transaction corresponding to the confirmed portion of the purchase and the transmitter transmits a confirmation of the completed payment transaction corresponding to the confirmed portion of the purchase to the vendor website, wherein the vendor is a third party vendor.

2. The system of claim 1, wherein the token is an encrypted string and is embedded in a message body of the second email.

3. The system of claim 1, wherein the token is an encrypted image attached to the second email.

4. The system of claim 1, wherein the vendor is an online retail website.

5. The system of claim 1, wherein the vendor is a non-profit organization and the at least one item to be purchased is a donation to the non-profit organization.

6. The system of claim 1, further comprising the transmitter further configured to transmit a confirmation of purchase of the at least one item to the customer.

7. The system of claim 6, wherein the confirmation of purchase of the at least one item is in the form of an SMS message.

8. A method for secure email checkout for communication between a customer device, a vendor website and a payment server, the method utilizing at least two emails to complete payment for at least one item to be purchased on the vendor website, the method comprising:
   at the payment server;
     storing, by a computer memory, customer information, the customer information including a customer name, customer email address, customer shipping address, and customer billing information;
     receiving, by a receiver, a request for a purchase from the vendor, the request for purchase including an email address and transaction information regarding the at least one item to be purchased, the transaction information including at least an identification of the item to be purchased and a price;

determining, by a processor, whether the received email address matches the customer email address stored in the computer memory;

transmitting, by a transmitter, a first email to the customer email address requesting authorization to complete a purchase of the at least one item including the transaction information, wherein the first email includes a mailto link that is encoded with a token; whereby selection of the mailto link by the customer generates a second email from the customer email address which includes the token;

receiving, by the receiver, the second email, from the customer email address, the second email confirms at least a portion of the purchase and cancels at least a portion of the purchase;

authenticating, by the processor, the second email using the customer email address and the token; and in response to a valid result of the authentication, completing by the processor a payment transaction corresponding to the confirmed portion of the purchase and transmitting, by the transmitter, a confirmation of the completed payment transaction corresponding to the confirmed portion of the purchase to the vendor website, wherein the vendor is a third party vendor.

9. The method of claim 8, wherein the token is an encrypted string and is embedded in a message body of the second email.

10. The method of claim 8, wherein the token is an encrypted image attached to the second email.

11. The method of claim 8, wherein the vendor is an online retail website.

12. The method of claim 8, wherein the vendor is a non-profit organization and the at least one item to be purchased is a donation to the non-profit organization.

13. The method of claim 8, further comprising transmitting, by the transmitter, a confirmation of purchase of the at least one item to the customer.

14. The method of claim 13, wherein the confirmation of purchase of the at least one item is in the form of an SMS message.

15. A system for leveraging email to complete an online checkout from a customer accessing a third party vendor website, the system utilizing at least two emails to complete payment for an amount to be donated on the third party vendor website, the system comprising:

a computer memory, operably connected to a processor, configured to store customer information, the customer information including a customer name, customer email address, customer shipping address, and customer billing information;

a receiver, operably connected to the processor, configured to receive a donation from the third party vendor, the donation including an email address and the amount to be donated;

the processor configured to determine whether the received email address matches the customer email address stored in the computer memory;

a transmitter, operably connected to the processor, configured to transmit a first email to the customer email address requesting authorization to complete the donation, wherein the first email includes a mailto link that is encoded with a token, whereby selection of the mailto link by the customer generates a second email from the customer email address which includes the token;

the receiver further configured to receive the second email, from the customer email address, the second email confirms at least a portion of the donation and cancels at least a portion of the donation;

the processor further configured to authenticate the second email using the customer email address and the token; and in response to a valid result of the authentication, the processor completes a payment transaction corresponding to the confirmed portion of the donation and the transmitter transmits a confirmation of the completed payment transaction corresponding to the confirmed portion of the donation to the third party vendor website.

\* \* \* \* \*